United States Patent [19]
Gress

[11] Patent Number: 5,890,852
[45] Date of Patent: Apr. 6, 1999

[54] THREAD CUTTING DIE AND METHOD OF MANUFACTURING SAME

[75] Inventor: Paul W. Gress, Bay Village, Ohio

[73] Assignee: Emerson Electric Company, St. Louis, Mo.

[21] Appl. No.: 40,141

[22] Filed: Mar. 17, 1998

[51] Int. Cl.$^6$ .................................................... B23G 5/04
[52] U.S. Cl. .......................... 408/221; 76/115; 408/144; 470/185; 451/48
[58] Field of Search .................................... 76/107.1, 115, 76/117; 408/144, 221, 215, 216; 451/48; 470/185, 187, 183

[56] References Cited

U.S. PATENT DOCUMENTS

| | | | |
|---|---|---|---|
| 4,266,449 | 5/1981 | Bielby | 76/115 |
| 4,708,542 | 11/1987 | Emanuelli | 408/144 |
| 4,813,260 | 3/1989 | Hayes et al. . | |

FOREIGN PATENT DOCUMENTS

| | | | |
|---|---|---|---|
| 172403 | 9/1985 | Japan | 408/215 |
| 197317 | 10/1985 | Japan | 470/185 |
| 27809 | 1/1989 | Japan | 470/185 |

OTHER PUBLICATIONS

*Coating Technology Handbook,* edited by D. Satas, Copyright 1991 by Marcel Dekker, Inc., pp. 252–258.
*Ridgid* Catalog of the Ridge Tool Company, Catalog No. RT–196, Jan. 1996, p. 43.

*Primary Examiner*—Daniel W. Howell
*Attorney, Agent, or Firm*—Vickers, Daniels & Young

[57] ABSTRACT

A thread cutting die or chaser for use with a power driven thread cutting machine is provided with a protective coating of an ultra hard material such as titanium nitride which is initially excluded from or is subsequently removed from the faces of the thread cutting teeth such as by a regrinding thereof after application of the coating to the die.

16 Claims, 1 Drawing Sheet

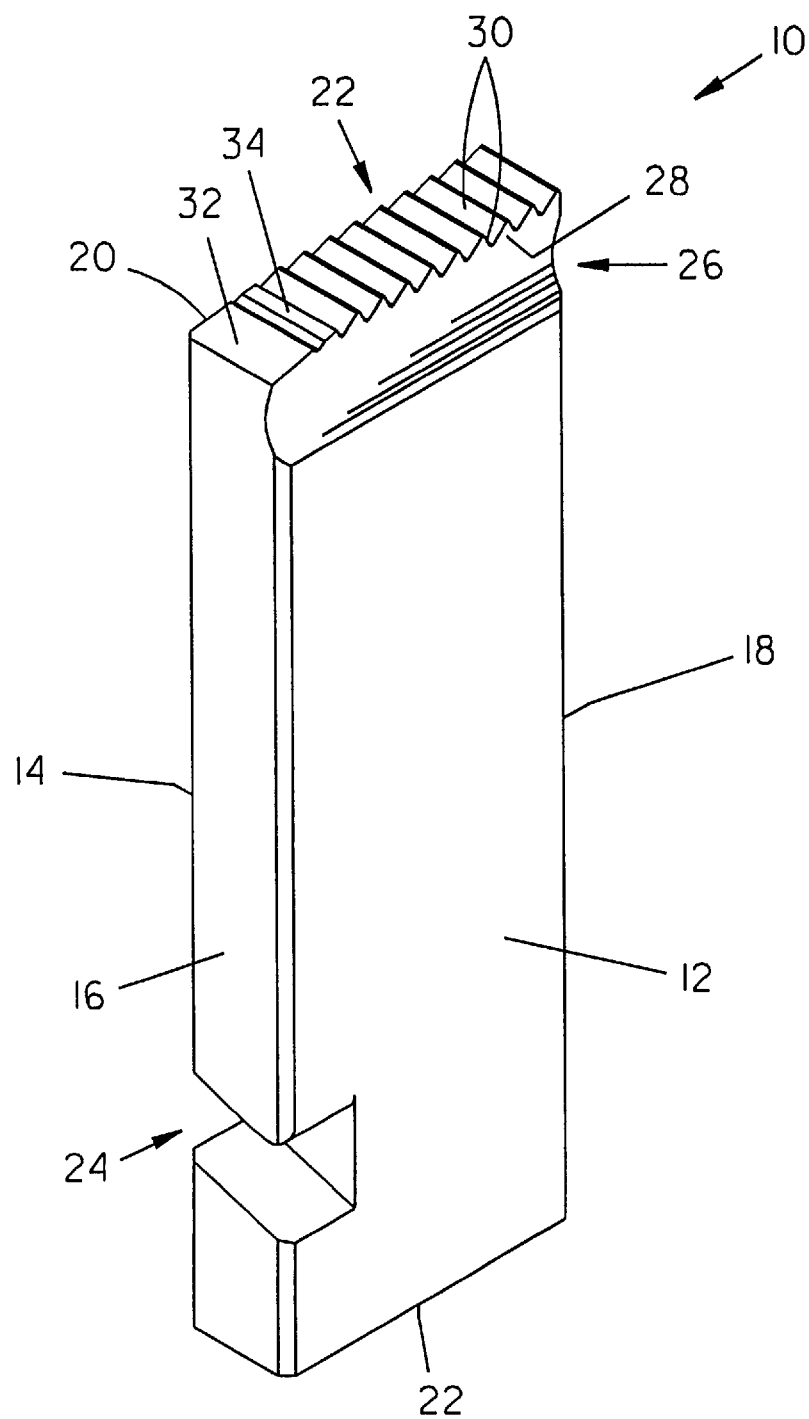

5,890,852

THREAD CUTTING DIE AND METHOD OF MANUFACTURING SAME

BACKGROUND OF THE INVENTION

This invention relates to the art of thread cutting and, more particularly, to an improved thread cutting die and method of making the same.

It is of course well known to provide threads on the end of a workpiece through relative rotational and axial displacement between the workpiece and thread cutting dies supported on a thread cutting die head. The die head may be manually rotated relative to the workpiece, or mounted on the tool carriage of a power driven threading machine in which the workpiece to be threaded rotates relative to the die head. Such a power-driven thread cutting machine is shown, for example, in U.S. Pat. No. 4,613,260 to Hayes, et al., the disclosure of which is hereby incorporated herein by reference for background information. The thread cutting dies are made from high speed steel bar stock and haste thread cutting teeth on one end thereof which extend in the direction of relative rotation between the die head and workpiece. It is known that the coating of such dies, including the teeth, with an ultra hard material such as titanium nitride having a hardness greater than that of high speed steels improves the cutting performance of the dies and extends the life thereof, especially in high volume output situations and in threading hard to cut materials such as stainless steel.

SUMMARY OF THE INVENTION

While coated thread cutting dies heretofore available provide the foregoing advantages, it has been discovered that further improvement in connection with the quality of the threads cut is achieved by removing the coating from the faces of the teeth of the cutting die prior to using the latter. Particularly in this respect, vibration or chatter is reduced, especially in connection with dry thread cutting operations, whereby the quality of the thread is improved relative to that achieved with the coating on the tooth faces. In connection with manufacturing the thread cutting die, the teeth are preferably formed by grinding and, after the coating is applied to extend over the entire tooth form and shank of the cutting die, the coating is removed from the teeth faces such as by a regrinding operation. Alternatively, the coating can be applied to the die so as to exclude coating of the faces of the teeth. In either event, the coating remains on the shank of the cutting die and thus provides the increased hardness at the leading edge of the teeth with respect to the direction of cutting to promote improved performance and tool life relative to uncoated high speed steel cutting dies. At the same time, the improved performance is further enhanced by the removal or absence of the protective coating from the faces of the thread cutting teeth.

It is accordingly an outstanding object of the present invention to provide an improved thread cutting die of the character having thread cutting teeth formed on one end of a block of high speed steel and a protective coating of a material having a hardness greater than that of the high speed steel.

Another object is the provision of an improved thread cutting die of the foregoing character wherein the faces of the thread cutting teeth are free of the coating material.

Yet a further object is the provision of a method of making a thread cutting die of the foregoing character by applying a coating of ultra hard material such as titanium nitride to all parts of the die except the faces of the cutting teeth.

Still another object is the provision of a method of producing a thread cutting die of the foregoing character wherein the coating material is applied to the teeth and is removed from the teeth prior to use of the thread cutting die.

Another object is the provision of a method of the foregoing character wherein the teeth are provided on the high speed steel block by grinding and wherein the coating material is subsequently removed by regrinding the teeth.

BRIEF DESCRIPTION OF THE DRAWING

The drawing is a perspective view of a thread cutting die in accordance with the present invention.

DESCRIPTION OF A PREFERRED EMBODIMENT

Referring now to the drawing wherein the showing is only for the purpose of illustrating a thread cutting die of the character to which the present invention is applicable, the thread cutting die designated generally by the numeral 10 is formed from a bar of high speed steel which has a Rockwell C hardness of Rc 58 to 68. Die 10 has apair of spaced apart parallel side walls 12 and 14 and a pair of spaced apart parallel end walls 16 and 18 and, in the orientation shown in the drawing, has an upper end 20 and a lower end 22 each extending between the pairs of side walls and end walls. Thread cutting teeth 22 are provided on upper end 20, preferably by grinding, and extend in the direction between side walls 12 and 14, whereby the teeth are adjacent to one another in the direction between end walls 16 and 18. Cutting die 10 is provided adjacent lower end 22 thereof with a cam recess 24 which, as is well known and shown in the aforementioned patent to Hayes, et al. for example, facilitates radial displacement of the cutting die relative to a die head during operation of a threading machine. More particularly, as will be seen from the foregoing patent, a cam supported on the die head for rotation relative thereto engages in the threading die cam recess, whereby the die is reciprocated in response to rotation of the cam in opposite directions relative to the die head. As is further well known in connection with such thread cutting dies, the cutting end thereof is provided with an arcuate undercut 26 which is shown in side wall 12 and extends between end wall 16 and 18. Undercut 26 intersects the corresponding ends of cutting teeth 22 to provide lip 28 therewith which defines the leading ends of teeth 22 with respect to the direction of thread cutting. As will be appreciated from the drawing, adjacent ones of the cutting teeth 22 have planar teeth faces 30 diverging relative to one another in the direction outwardly of end 20 of the die. As is well known and will be further appreciated from the drawing, the tooth grinding process provides a profile which includes outer end faces 32 and 34 extending from end wall 16 toward end wall 18 of the cutting die.

As mentioned hereinabove, high speed steels for thread cutting dies or chasers of the foregoing character generally have a hardness of Rc 58 to 68 and are used, without more, in connection with the cutting of threads on most pipe and rod metals. However, in connection with high volume output shops and the threading of hard to cut materials such as stainless steels, improved cutting performance and extended life for the cutting dies is realized by coating the dies with an ultra hard protective coating material such as titanium nitride. The coating, which can be of other ultra hard materials such as titanium aluminum nitride, titanium zirconium nitride and titanium vanadium nitride, for example, can be applied by any one of a number of known sputter deposition processes such as dc and rf diode sputtering, dc and rf triode sputtering, magnetron and unbalanced magnitron sputtering. The coating process can cover the thread cutting die in its entirety with the exception, perhaps, of bottom end 22 and, in such cases, extends over the entire chaser tooth form and shank and, accordingly, covers tooth faces 30 and end faces 32 and 34 as well as undercut 26, side walls 12 and 14 and end walls 16 and 18. Alternatively, the coating can be applied so as to exclude coating of the faces 30 of the teeth. Titanium nitride has a hardness of Rc 80 to 85 and, preferably, the coating has a thickness of from 3.5 to 6 microns. Such an ultra hard protective coating advantageously resists scratching, wearing and corrosion, thus prolonging tool life and providing improved performance over non-coated high speed steel dies. Moreover, the coating, which heretofore was intentionally applied to faces 30 of the teeth, is not removed as a result of using the cutting dies.

While it is not clearly understood why, it has been discovered that the performance of a coated thread cutting die of the foregoing character can be improved beyond the improvement which is realized by the use of such coating in comparison with uncoated high speed steel threading dies. More particularly in this respect, such increased cutting performance is achieved by initially excluding or subsequently removing the coating from faces 30 of the cutting teeth from the root lines between adjacent teeth and the apexes of the teeth. If the teeth are initially coated, such coating removal can be achieved by regrinding the teeth. In any event, it will be appreciated that the coating remains on undercut 26 and the ends of teeth 22 at lip 28 to maintain the advantage of the ultra hardness of the coating at the leading edges of the teeth with respect to the direction of thread cutting.

While the forming of the teeth is described herein as being achieved by grinding, it will be appreciated that the teeth can be formed otherwise, such as by milling or shaping and that where removal of the coating of ultra hard material is necessary, removal can be achieved other than by grinding. These and other modifications of the preferred embodiment will be suggested or obvious to those skilled in art from the description herein, whereby it is to be distinctly understood that the foregoing descriptive matter is to be interpreted merely as illustrative of the present invention and not as a limitation.

Having thus described the invention, it is so claimed:

1. In a method of manufacturing a thread cutting die from a bar of high speed steel having a given hardness, said die having an opposed pair of side walls, an opposed pair of end walls and an end between said side walls and end walls, said method including the steps of forming thread cutting teeth on said end between said side walls and disposed side by side in the direction between said end walls, and providing said teeth and at least a portion of each said pair of side walls and end walls with a protective coating of a material having a hardness greater than said given hardness, the improvement comprising: removing said coating from said teeth.

2. The improvement according to claim 1, wherein said coating is taken from the group consisting of titanium nitride, titanium aluminum nitride, titanium zirconium nitride, and titanium vanadium nitride.

3. The improvement according to claim 2, wherein said coating is titanium nitride.

4. The improvement according to claim 3, wherein said teeth are provided by grinding and said coating is removed by regrinding said teeth.

5. The improvement according to claim 2, wherein said teeth are provided by grinding and said coating is removed by regrinding said teeth.

6. The improvement according to claim 1, wherein said teeth are provided by grinding and said coating is removed by regrinding said teeth.

7. A method of manufacturing a thread cutting die from a bar of high speed steel having a given hardness, said die having an opposed pair of side walls, an opposed pair of end walls and an end between said side walls and end walls, said method including the steps of forming thread cutting teeth on said end between said side walls and disposed side by side in the direction between said end walls, providing at least a portion of each said pair of side walls and end walls with a protective coating of a material having a hardness greater than said given hardness, and excluding said coating from said teeth.

8. The improvement according to claim 7, wherein said coating is taken from the group consisting of titanium nitride, titanium aluminum nitride, titanium zirconium nitride, and titanium vanadium nitride.

9. The improvement according to claim 8, wherein said coating is titanium nitride.

10. A thread cutting die comprising a bar of high speed steel having a given hardness, first and second pairs of opposite sides and an end between said pairs of sides, thread cutting teeth on said end, said teeth extending between the sides of one of said pairs of sides, and being disposed in side by side relationship in the direction between the sides of the other of said pairs of sides, adjacent ones of said teeth in said direction having planar tooth surfaces diverging relative to one another in the direction outwardly of said end, and a protective coating of a material having a hardness greater than said given hardness, said coating being on said pairs of opposite sides and on said end except for said tooth surfaces.

11. The die according to claim 10, wherein said given hardness is Rc 58 to 68.

12. The die according to claim 11, wherein said coating is titanium nitride.

13. The die according to claim 10, wherein said coating has a thickness of from 3.5 to 6 microns.

14. The die according to claim 13, wherein said coating is titanium nitride.

15. The die according to claim 10, wherein said coating is titanium nitride.

16. The die according to claim 15, wherein said given hardness is Rc 58 to 68 and said coating has a thickness of from 3.5 to 6 microns.

* * * * *

UNITED STATES PATENT AND TRADEMARK OFFICE
CERTIFICATE OF CORRECTION

PATENT NO. : 5,890,852
DATED : April 6, 1999
INVENTOR(S) : Paul W. Gress

It is certified that error appears in the above-identified patent and that said Letters Patent is hereby corrected as shown below:

Column 1, line 19, change "haste" to --have--.

Column 2, line 20, change "apair" to --a pair--.

Signed and Sealed this

Seventeenth Day of August, 1999

Attest:

Q. TODD DICKINSON

Attesting Officer

Acting Commissioner of Patents and Trademarks